(12) United States Patent
Haug

(10) Patent No.: US 8,639,493 B2
(45) Date of Patent: Jan. 28, 2014

(54) PROBABILISTIC NATURAL LANGUAGE PROCESSING USING A LIKELIHOOD VECTOR

(75) Inventor: Peter J. Haug, Salt Lake City, UT (US)

(73) Assignee: Intermountain Invention Management, LLC, Salt Lake City, UT (US)

( * ) Notice: Subject to any disclaimer, the term of this patent is extended or adjusted under 35 U.S.C. 154(b) by 444 days.

(21) Appl. No.: 12/642,675

(22) Filed: Dec. 18, 2009

(65) Prior Publication Data

US 2010/0161316 A1 Jun. 24, 2010

Related U.S. Application Data

(60) Provisional application No. 61/138,897, filed on Dec. 18, 2008.

(51) Int. Cl.
*G06F 17/28* (2006.01)

(52) U.S. Cl.
USPC ..................... 704/9; 704/1; 704/10

(58) Field of Classification Search
USPC .................................. 704/1, 9, 10
See application file for complete search history.

(56) References Cited

U.S. PATENT DOCUMENTS

| | | | |
|---|---|---|---|
| 5,887,120 A | 3/1999 | Wical | |
| 6,292,771 B1 * | 9/2001 | Haug et al. ............. | 704/9 |
| 6,556,964 B2 * | 4/2003 | Haug et al. ............. | 704/9 |
| 6,611,825 B1 | 8/2003 | Billheimer et al. | |
| 7,065,483 B2 * | 6/2006 | Decary et al. ............. | 704/7 |
| 7,403,890 B2 * | 7/2008 | Roushar ............. | 704/9 |
| 7,813,916 B2 * | 10/2010 | Bean ............. | 704/9 |
| 7,835,902 B2 * | 11/2010 | Gamon et al. ............. | 704/9 |
| 2004/0093331 A1 * | 5/2004 | Garner et al. ............. | 707/3 |
| 2005/0108001 A1 * | 5/2005 | Aarskog ............. | 704/10 |
| 2006/0212441 A1 * | 9/2006 | Tang et al. ............. | 707/5 |
| 2006/0245641 A1 * | 11/2006 | Viola et al. ............. | 382/155 |
| 2007/0005566 A1 * | 1/2007 | Bobick et al. ............. | 707/2 |
| 2009/0326919 A1 * | 12/2009 | Bean ............. | 704/9 |

OTHER PUBLICATIONS

International Search Report issued for International Patent Application No. PCT/US09/68861 on Mar. 4, 2010.
International Preliminary Report on Patentability issued for International Patent Application No. PCT/US2009/068861 on Jun. 30, 2011.
Sager et al., "Natural language processing and the representation of clinical data", JAMIA, vol. 1, pp. 142-160, 1994.
Gabrielli, ER, "Computer assisted assessment of patient care in the hospital", Journal of Medical Systems, vol. 12, iss. 3, p. 135-146, 1988).
Sager et al. "Medical Language Processing: Computer Management of Narrative Data," Addison-Wesley, Menlo Park, Calif., 1987.

(Continued)

*Primary Examiner* — Douglas Godbold
(74) *Attorney, Agent, or Firm* — Austin Rapp & Hardman

(57) ABSTRACT

A method for natural language processing on a computing device is described. The computing device receives a free text document. The computing device parses the free text document for gross structure. The gross structure includes sections, paragraphs and sentences. The computing device determines an application of at least one knowledge base. The free text document is parsed for fine structure on the computing device. The fine structure includes sub-sentences. The computing device applies the parsed document and at least one likelihood vector to a Bayesian network. The computing device outputs meanings and probabilities.

18 Claims, 12 Drawing Sheets

(56) References Cited

OTHER PUBLICATIONS

Friedman et al. "A general natural-language text processor for clinical radiology," JAMIA, vol. 1, pp. 161-174, 1994.

Zingmond and Lenert, "Monitoring free-text data using medical language processing", Comp. Biomed. Res., vol. 265, pp. 467-481, 1993.

Haug et al. "A Natural Language Understanding System Combining Syntactic and Semantic Techniques," Eighteenth Annual Symposium on Computer Applications in Medical Care, pp. 247-251, 1994.

Haug et al. "Experience with a Mixed Semantic/Syntactic Parser," Nineteenth Annual Symposium on Computer Applications in Medical Care, pp. 284-288, 1995).

Gunderson et al. "Development and Evaluation of a Computerized Admission Diagnoses Encoding System," Comp. Biomed. Res, vol. 29, pp. 351-372, 1996).

Pearl, "Probabilistic Reasoning in Intelligent Systems: Networks of Plausible Inference," Morgan Kaufman, San Mateo, Calif., 1988).

Neopolitan, "Probabilistic Reasoning in Expert Systems," Wiley, New York, N.Y., 1990.

SYMTEXT A Natural Language Understanding System for Encoding Free Text Medical Data, by Spencer B. Koehler. This document is Dr. Koehler's Ph.D. dissertation, published by the University of Utah in Jun. 1998.

Kuperman et al., Help: A Dynamic Hospital Information System, Springer-Verlag, New York, 1991.

James Allen, "Natural Language Understanding," Benjamin/Cummings Pub. Co., Menlo Park, CA, 1987.

Fiszman M, Chapman WW, Aronsky D, Evans RS, Haug PJ. Automatic detection of acute bacterial pneumonia from chest X-ray reports. J Am Med Inform Assoc. Nov.-Dec. 2000;7(6):593-604.

Fiszman M, Haug PJ. Using Medical Language Processing to Support Real-Time Evaluation of Pneumonia Guidelines. Proc AMIA Symp 2000:235-9.

Chapman WW, Aronsky D, Fiszman M, Haug PJ. Contribution of a Speech Recognition System to Computerized Guidelines in the Emergency Department. Proc AMIA Symp 2000:131-135.

Chapman WW, Fiszman M, Frederick PR, Chapman BE, Haug PJ. Quantifying the characteristics of unambiguous chest radiography reports in the context of pneumonia. Acad Radiol Jan. 2001;8(1):57-66.

Chapman WW, Fiszman M, Chapman BE, Haug PJ. A comparison of classification algorithms to automatically identify chest X-ray reports that support pneumonia. J Biomed Inform Feb. 2001;34(1):4-14.

Christensen L, Haug PJ, Fiszman M. MPLUS: a probabilistic medical language understanding system. Proceedings of the 40th Annual Meeting of the ACL (Association for Computational Linguistics) 2002.

* cited by examiner

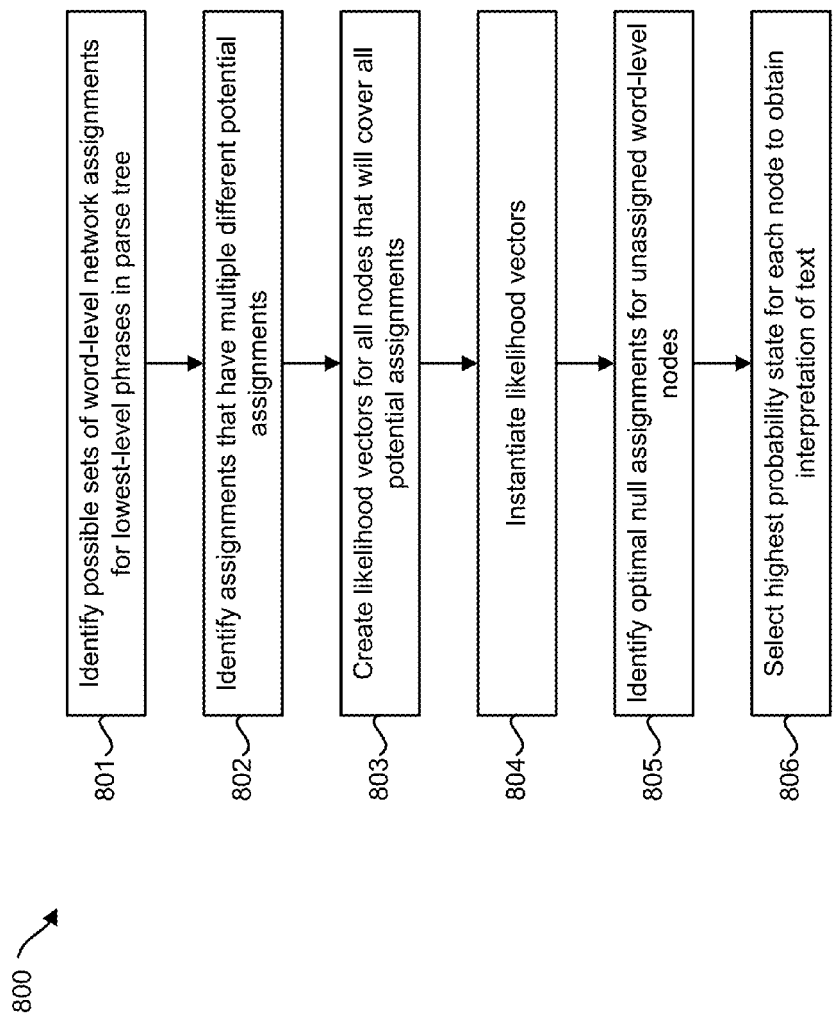

PROBABILISTIC NATURAL LANGUAGE PROCESSING USING A LIKELIHOOD VECTOR

RELATED APPLICATIONS

This application claims the benefit of U.S. Provisional Patent Application Ser. No. 61/138,897 entitled "Probabilistic Systems and Methods for Natural Language Processing Using a Likelihood Vector," which was filed Dec. 18, 2008.

TECHNICAL FIELD

The present invention relates generally to encoding free text data. More specifically, the present invention relates to probabilistic systems and methods for natural language processing using a likelihood vector.

BACKGROUND

In order to make coded data available in a setting where a large subset of the information resides in natural language documents; a technology called natural language understanding (NLU) is required. This technology allows a computer system to "read" free-text documents, convert the language in these documents to concepts, and capture these concepts in a coded form in a medical database. NLU has been a topic of interest for many years. However, it represents one of the most difficult problems in artificial intelligence. Various approaches have been tried with varied degrees of success. Most current systems are still in the research stage, and have either limited accuracy or the capability to recognize only a very limited set of concepts.

NLU systems which have been developed for use in the field of medicine include those of Sager et al. ("Natural language processing and the representation of clinical data", JAMIA, vol. 1, pp 142-160, 1994), and Gabrielli ("Computer assisted assessment of patient care in the hospital", J. Med. Syst., vol. 12, p 135, 1989). One approach has been to made use of regularities in speech patterns to break sentences into their grammatical parts. Many of these systems work well in elucidating the syntax of sentences, but they fall short in consistently mapping the semantics of sentences.

The concepts and ultimate data base representation of the text may be derived from its semantics. Systems which rely upon the use of semantic grammars include those of Sager et al. (Medical Language Processing: Computer Management of Narrative Data, Addison-Wesley, Menlo Park, Calif., 1987) and Friedman et al. ("A general natural-language text processor for clinical radiology," JAMIA, vol. 1, pp. 161-174, 1994). Zingmond and Lenert have described a system which performs semantic encoding of x-ray abnormalities ("Monitoring free-text data using medical language processing", Comp. Biomed. Res., vol. 265, pp. 467-481, 1993).

A few systems have been developed which used a combination of semantic and syntactic techniques, e.g., Haug et al. (as described in "A Natural Language Understanding System Combining Syntactic and Semantic Techniques," Eighteenth Annual Symposium on Computer Applications in Medical Care, pp. 247-251, 1994 and "Experience with a Mixed Semantic/Syntactic Parser," Nineteenth Annual Symposium on Computer Applications in Medical Care, pp. 284-288, 1995) and Gunderson et al. ("Development and Evaluation of a Computerized Admission Diagnoses Encoding System," Comp. Biomed. Res, Vol. 29, pp. 351-372, 1996).

Bayesian networks, also known as causal or belief networks, are trainable systems, which have been used to apply probabilistic reasoning to a variety of problems. These networks are described in some detail in Pearl (Probabilistic Reasoning in Intelligent Systems: Networks of Plausible Inference, Morgan Kaufman, San Mateo, Calif., 1988) and Neopolitan (Probabilistic Reasoning in Expert Systems, Wiley, New York, N.Y., 1990).

All of the above references are incorporated herein by reference.

BRIEF DESCRIPTION OF THE DRAWINGS

FIG. 8 is a flow diagram illustrating the operation of a semantic analyzer;

DETAILED DESCRIPTION

Figure 1:
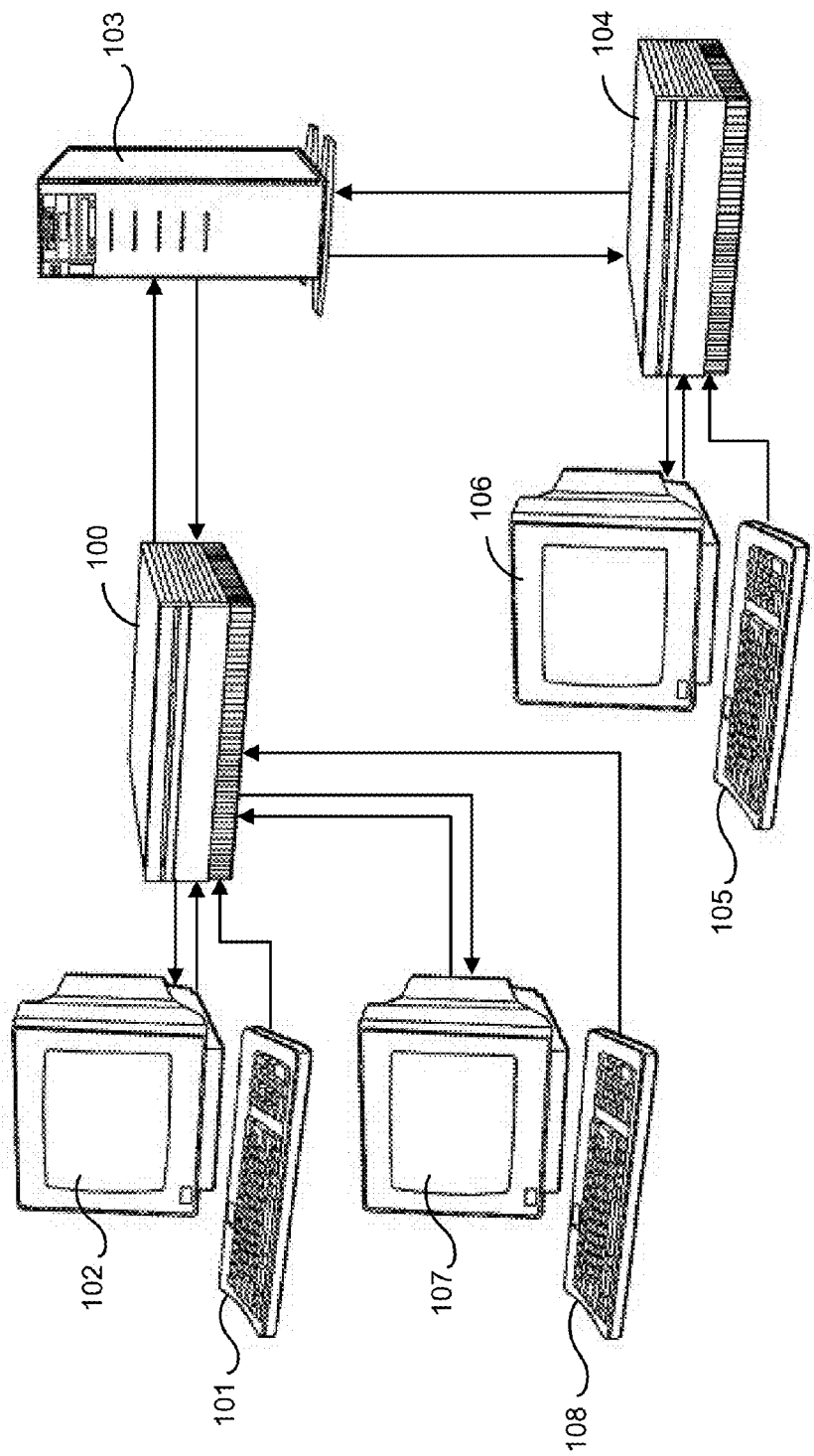
FIG. 1 is a block diagram illustrating one configuration of a system wherein a method for natural language processing may be practiced.

A method for natural language processing on a computing device is described. The computing device receives and parses a free text document for gross structure. Gross structure comprises sections, paragraphs and sentences. The computing device determines an application of at least one knowledge base and parses the free text document for fine structure. Fine structure includes sub-sentences. The parsed document and at least one likelihood vector are applied to a Bayesian network. The computing device may then output meanings and probabilities. Outputting meanings and probabilities includes storing the meanings and probabilities in a database or encoding at least one portion of the free text based on the meanings and probabilities.

Applying the parsed document and likelihood vector to the Bayesian network may include identifying possible sets of word-level network assignments for lowest-level phrases in a parse tree, identifying assignments that have multiple different potential assignments and creating likelihood vectors for all nodes of the Bayesian network (i.e. the likelihood vectors cover all potential assignments). Applying the parsed document and likelihood vector to the Bayesian network may also include instantiating the likelihood vectors, identifying optimal null assignments for unassigned word-level nodes and selecting the highest probability state for each node to obtain an interpretation of text.

The likelihood vectors may be calculated based on a first probability that a statement in the free text document has a particular meaning and on a second probability that the statement has the particular meaning given additional information from outside the Bayesian network.

Applying the likelihood vector to the Bayesian network may simplify the Bayesian network such that a single node replaces multiple nodes, introduces at least one value into a node which allows automating an amount of token slotting during training and allows multiple nodes to be replaced with a signal node such that a token may be slotted without concern for multiple choices.

A computing device that is configured for natural language processing is disclosed. The computing device includes a processor, memory in electronic communication with the processor and instructions stored in the memory. The instructions are executable to receive a free text document, parse the free text document for gross structure (gross structure includes sections, paragraphs and sentences), determine an application of at least one knowledge base, parse the free text document for fine structure (fine structure includes sub-sentences), apply the parsed document and at least one likelihood vector to a Bayesian network and outputs meanings and probabilities.

The present invention uses a probabilistic model of the meaning of medical reports to extract and encode medical concepts. It makes use of Bayesian networks to map from groups of words and phrases to concepts. This approach has the potential to bridge the gap between free-text and coded medical data and to allow computer systems to provide the advantages of both. Natural language is common in medical systems and is becoming more common. Not only is dictation and transcription widespread in medical information systems, but new technologies (e.g., computer systems that convert speech to text) are beginning to arrive that will made free-text documents easier and less expensive to produce. Accordingly, a system, which allows free-text data to be transformed to coded data will be increasingly valuable in medical applications. The inventive system disclosed herein may be used for the encoding of free-text diagnoses and for the encoding of x-ray reports. However, the inventive system could also be used in legal and other fields.

It is desirable to provide a method for capturing and manipulating large amounts of medical data within medical information system databases wherein natural language free-text data is extracted and encoded to provide standardized coded data. In particular, it is desirable to provide a method and system which makes use of trainable Bayesian networks to provide accurate mapping of free-text words into a coded form. Moreover, it is desirable to provide a computer system, which is designed to efficiently, and automatically perform the method of this invention.

The objectives of this invention are achieved by a method comprising the steps of receiving free-text data and other information; performing synonym checking; performing spell checking; syntactic parsing; grammar transformation; performing semantic analysis; and writing discrete concepts, as standardized medical codes, into a medical database.

In one configuration of the invention, a semantic parser uses a probabilistic (Bayesian) network to perform statistical pattern recognition to form mapping between terms and concepts. Improved system performance is obtained by training the Bayesian network. Performance in accuracy and training efficiency may also be improved by the use of likelihood vectors as applied to the Bayesian network. That is, likelihood vectors may be used to allow simplification of Bayesian networks and simplify the creation of training material. The system has the advantage that it is capable of accurate recognition of a large number of concepts and that, once set up, its accuracy can be improved through a simple training program.

Additional details are described in SYMTEXT A Natural Language Understanding System for Encoding Free Text Medical Data, by Spencer B. Koehler. This document is Dr. Koehler's Ph.D. dissertation, published by the University of Utah in June of 1998. It is not the intent of the applicant that any additional new matter be included in this application by the incorporation of this Koehler dissertation.

I. Overview of the System Hardware and Software Environment

FIG. 1 is a block diagram illustrating one configuration of a system wherein a method for natural language processing may be practiced. In this configuration of the invention, medical data is entered into a first computer 100 on which hospital information system software is run. Data entry is accomplished by means of keyboard 101, with text displayed on monitor 102. Medical data is stored in a database on data storage device 103. The software used for performing the natural language understanding (NLU) task of the invention is run on computer system 104, which includes a keyboard 105 and monitor 106. The computer 100 may also include one or more additional monitor 107 and keyboard 108.

In the present example of one configuration of the invention, the hospital information system running on computer 100 is the HELP system (as described in Kuperman et al., HELP: A Dynamic Hospital Information System, Springer-Verlag, N.Y., 1991) running on computer hardware from Tandem Corporation. In the present example of one configuration of the invention, computer system 104 is an Apple Macintosh computer system. For example, the computer system may be a Power Macintosh 8100/80. This Macintosh computer has 64 megabytes of RAM and Ethernet connections to the local area network. The operating system version is Macintosh OS 7.5.1. Alternatively, any comparable computer system, which is capable of running ANSI standard common lisp environment and the tools necessary to run and query Bayesian networks, may be used. In the present example of the invention, Digitool Macintosh Common Lisp (MCL) and a Bayesian network API from Norsys Software Corporation are used.

II. Overview of the Inventive Process

As patients are admitted, an entry clerk enters a free-text description of the reason for admission into the hospital information system on computer system 100 (shown in FIG. 1), as indicated by the attending physician or other care giver involved in the admitting process. The free text is a phrase or sentence made up of words related by grammar, syntax, and semantic relationships. As admit information is entered, a program trigger associated with the entry of admit information causes that text, along with other patient information (in particular, the type of patient and type of physician), to be stored to a table in a local database on data storage device 103. In one configuration of the invention, said database is an Oracle database; however other databases with suitable data storage and access capabilities may be used as well.

A software process that performs the NLU task of interpreting the free-text resides on a Macintosh PowerPC 8100. In one example, all interpretive processing is carried out in code written in Macintosh Common Lisp (MCL 4.0).

Figure 2:
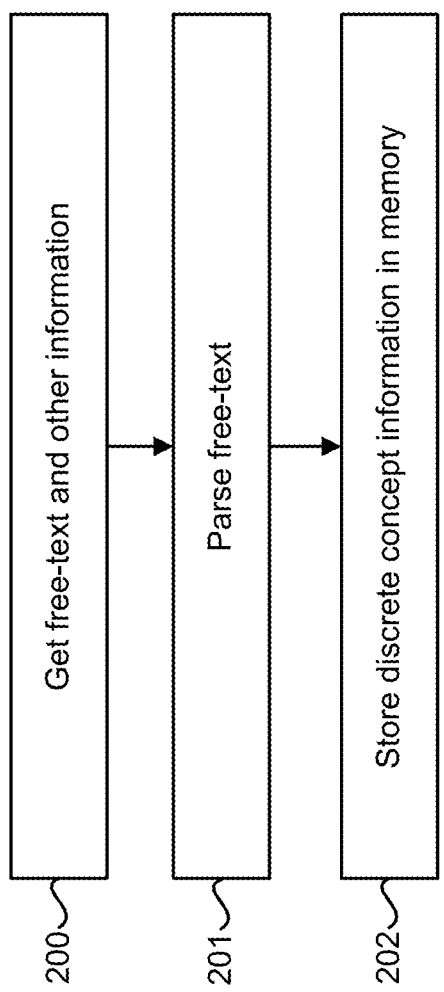
FIG. 2 is a flow diagram illustrating a process for obtaining and interpreting free-text information and returning the processed data.

FIG. 2 is a flow diagram illustrating a process for obtaining and interpreting free-text information and returning the processed data. Generally, the steps carried out by the system include obtaining free-text and other information at step 200, parsing the free text to obtain the discrete concepts contained in the free text, step 201, and storing the discrete concept information in memory, step 202, from which it can be made available for various types of further use or analysis.

The interpretive processes access and write information to the Oracle database via routines stored in the callable shared libraries. These routines make use of an API and pre-compiler provided by Oracle corporation, called "Pro-C", to do Oracle writes and queries from user-written programs.

The top-level code for interpreting free text can be found in a file. In the file, a text input routine controls the process of retrieving text, interpreting it and storing an interpretation back to Oracle (step 200 in FIG. 2). The input routine has access to the timestamp of the last record processed. It makes a call to another routine in a shared library which returns the next record after the current timestamp. After all recent records have been processed, the text input routine goes to sleep for 10 minutes before checking the oracle table again.

After retrieving a record and extracting its relevant information, the text input routine calls a text output routine which exists in the same file. The text output routine checks that the patient is of the right type, i.e., "inpatient". It then calls a process which calls further routines to parse and interpret the text (step 201 of FIG. 2). The main entry point into this parse process is a sentence parsing routine contained in a file. The sentence parsing routine returns a syntactic parsetree, and a complete description of the "instantiated" interpretive network the overall state of which represents the meaning of the text, and whose highest-level node (the "condition" node), represents the diagnosis.

A time-driven process running on the HELP system checks every hour for records that it hasn't seen before. It takes the patient id and interpretive ICD9 code, and writes them to the patient record on the HELP system (step 202 in FIG. 2).

Every morning, personnel in the Medical Records department get a list of patient admissions from the preceding day, along with the free-text, and the ICD9 code written out by the process just mentioned. If there are any codes that are missing or incorrect, the personnel enter the corrected codes for those admissions. As they are entered, a routine on the HELP system sensitive to the type of those corrections stores them to another table on the Oracle database, whence they can be correlated with the original record, producing a comparison of the originally generated with the user-corrected ICD9 codes. This gathering and correlating of original and corrected interpretations is done in several routines.

At periodic intervals, these correction records can be used to create new inputs to and corrections for the interpretive belief (Bayesian) network. These records are reviewed via a tool which creates new training cases incorporated into the network probabilities when the network is rebuilt. Another tool can be used to view all the cases that have gone into training the network so far, and thus reflect all the experience and biases of the network, and to make corrections to those cases. Trained personnel making use of the tools described above perform the above tasks manually. New inputs are created and the network trained on intervals dependent on the number of new errors produced by the system and at the convenience of the personnel. Typically, new input creation and network training are performed at roughly weekly intervals.

III. Detailed Description of the Parsing Process

Figure 3:
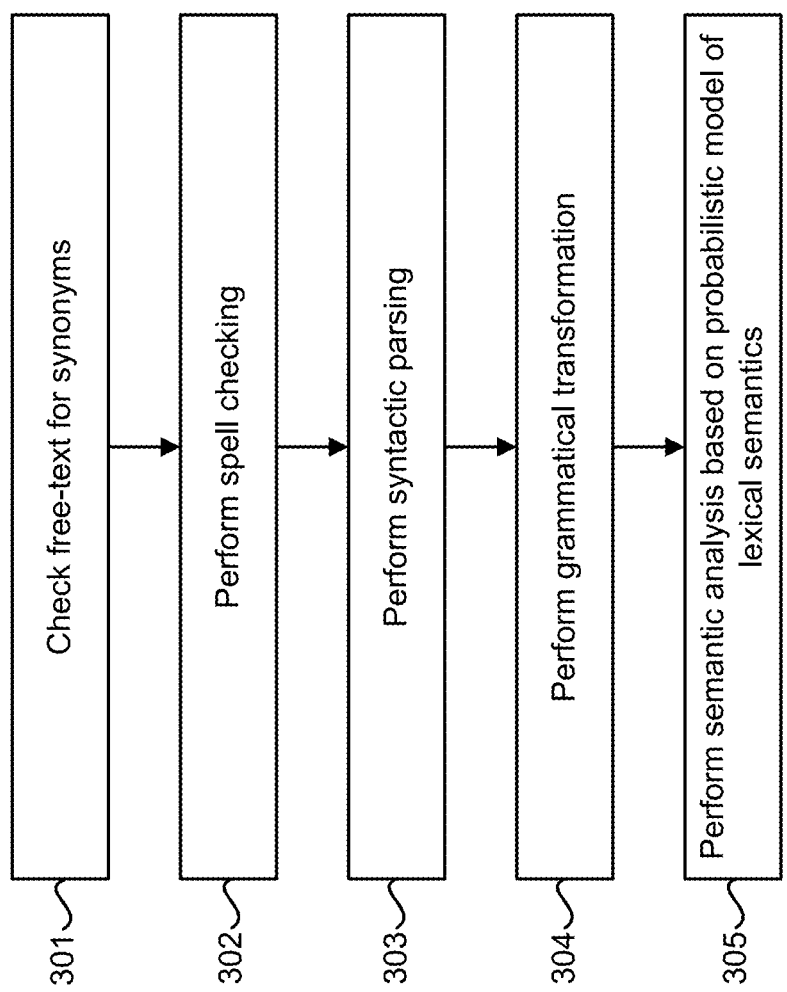
FIG. 3 is a flow chart showing steps for natural language parsing.

FIG. 3 is a flow chart illustrating a method for natural language parsing. As mentioned, the interpretation of the free text is carried out by a sentence-parsing routine. This sentence-parsing routine calls a sequence of processes, including a synonyms processor, semantically enhanced spellchecker, syntactic parser, transformational processor, and semantic analyzer. These are described below: 1—Synonyms: (step 301 in FIG. 3). The synonyms processor examines the input text, looking for words and phrases that might be abbreviations or variants on more standard usages, as well as common misspellings, and replaces them with the standard forms. For instance, "aaa" is a common abbreviation for "abdominal aortic aneurysm", and "a-fig" abbreviates "atrial fibrillation". Accordingly, the synonyms processor may take as its input a single word, an abbreviation, or a several-word phrase, and produces as its output a single-word or several-word phrase. 2—Spellchecker: The spellchecker is represented by step 302 in FIG. 3, and is presented in more detail in FIG. 4.

Figure 4:
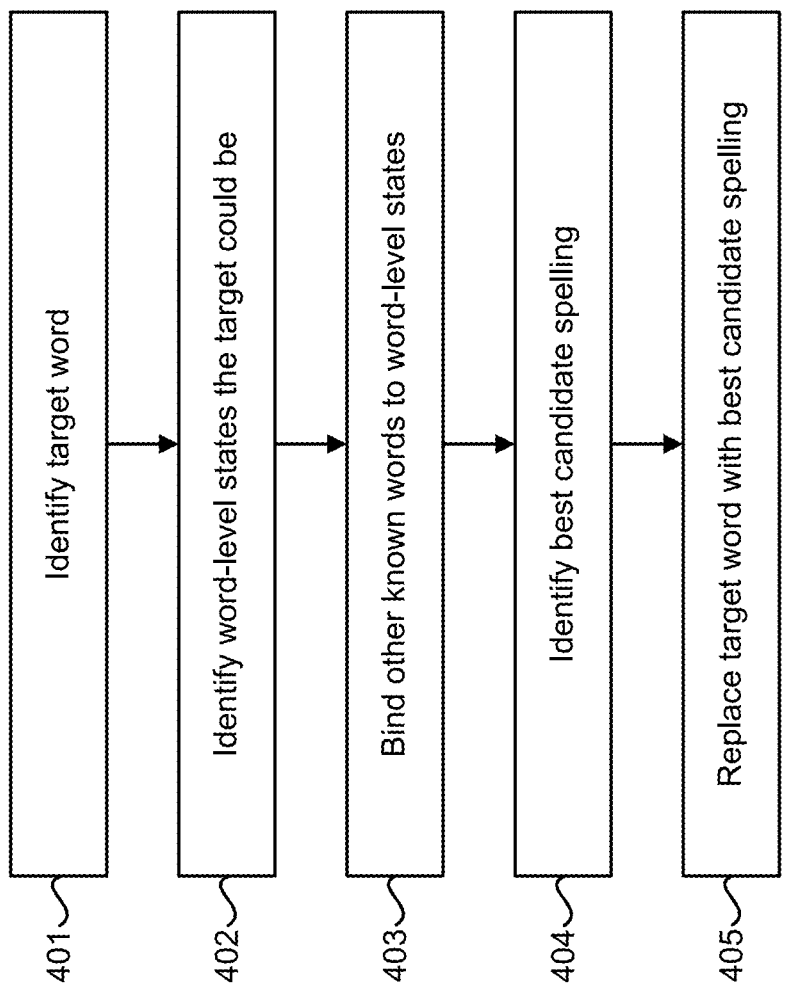
FIG. 4 is a flow chart showing a method for spell-checking.
Figure 5:
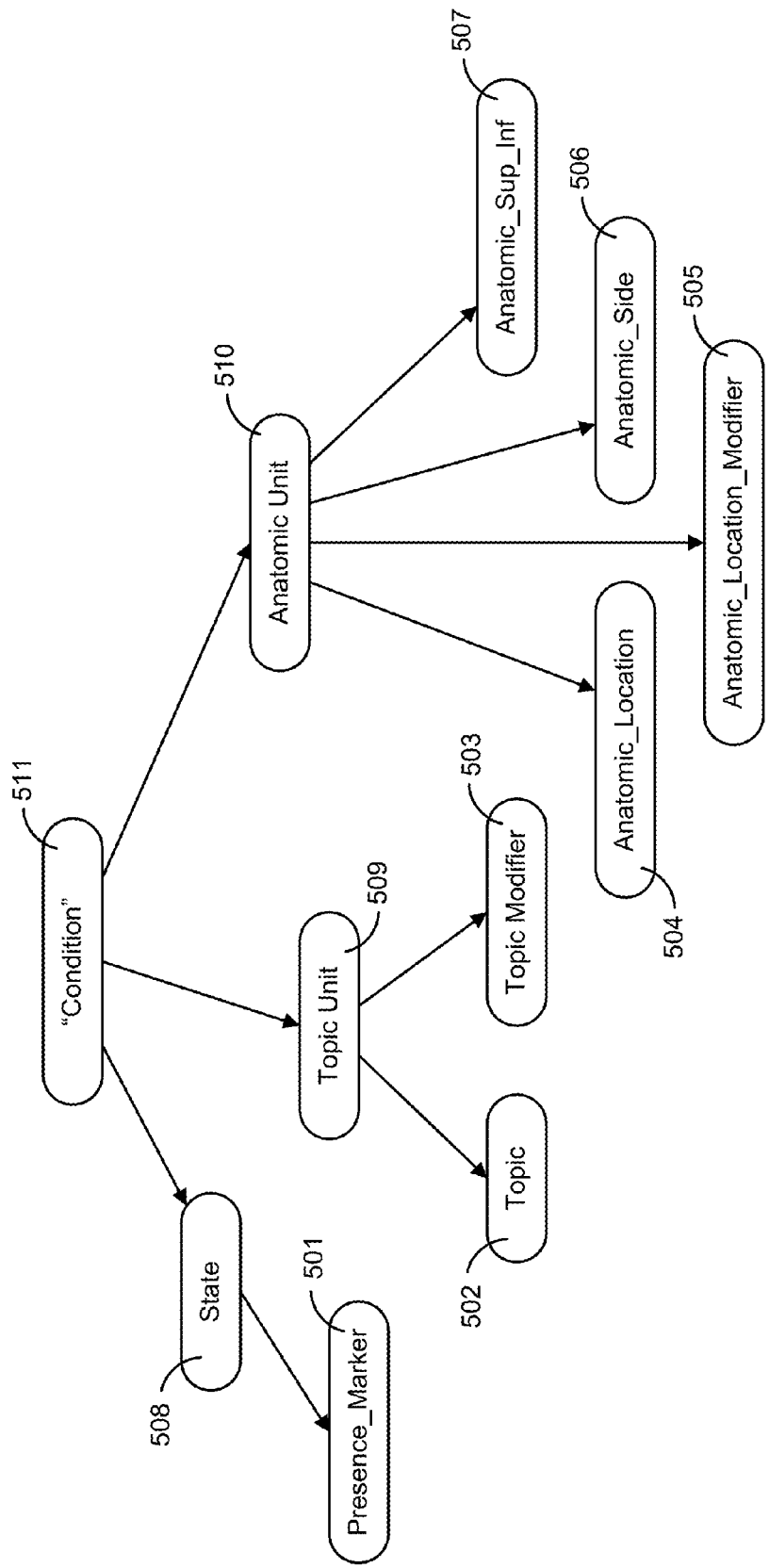
FIG. 5 is a diagram illustrating an example of a Bayesian network.

FIG. 4 is a flow chart showing a method for spell-checking. A target word for which spelling is checked is identified in step 401. Since only words and phrases, which are known to the interpretive Bayesian network, can be used in semantic analysis, this module attempts to determine whether the candidate word might be a misspelling of any of the known word-level node states. (The word-level is the lowest level or "leaf" level of the Bayesian network, representing words in the phrase being analyzed. The root level of the network represents the concept of the phrase. A Bayesian network is illustrated in FIG. 5). For instance, we frequently see the string "anurisum", which is a misspelling of "aneurysm".

In step 402, the spellchecker identifies a set of word-level states based on transformations of the target string into those states. For instance, "anurisum" is a misspelling of "aneurysm", given that it replaced the "eu" with "u", substituted "y" for "i", and replaced "sm" with "sum". The number and severity of the alterations required to transform one string into another provides an initial estimate of the likelihood that the one is a misspelling of the other.

Next, the spellchecker binds other known words in the sentence to word-level states in the interpretive network (step 403), and tries to identify which of the candidate spellings of the target word makes sense in the context of these words (step 404). If the network has training cases including the words "brain aneurysm", priming the network with "brain" will yield a high probability for "aneurysm", and a low probability for other candidates such as "anaphylactic". This measure of semantic coherence, along with the degree and severity of the misspelling, can be used to rank and select among various candidate spellings. Finally, the target work is replaced by the best (most probable) candidate spelling (step 405).

3—Syntactic parser (step 303 of FIG. 3). The syntactic parser may be a fairly standard implementation of a context-free grammatical parser, with adaptations for transformations based on the notion of "movement". These ideas are described in detail in James Allen's book "Natural Language Processing", which is incorporated herein by reference. Syntax is parsed in a manner constrained by ongoing analysis of semantic coherence of proposed syntactic relations within the parse, and of word-sense assignments to words within the parse.

4—Transformation component (step 304 of FIG. 3). This component implements the notion of a transformational grammar, as a means of determining the "deep" or semantic form of a sentence from recognizable surface characteristics. The transformation is constrained by ongoing analysis of semantic coherence of the proposed syntactic relations within the transformation. For instance, the "deep" form of "The patient is experiencing stomach pains and malaise" could be rendered "the patient is experiencing stomach pains, and the patient is experiencing malaise". The latter form groups words together in a semantically coherent way that makes the interpretation process much easier. In medical admissions, the admission text entries are typically shorthanded, abbreviated, and rarely comprise a full sentence, and such transformations are rarely needed. However, in other applications of the inventive system (e.g., analysis of X-ray images) free-text entries may be more complex and the transformational step is of greater importance for the overall accuracy of the system.

5—Semantic analyzer (Step 305 of FIG. 3). One feature of the present invention is that semantic analysis is performed according to a probabilistic model of lexical semantics. That is, concepts are related to words or phrases on a probabilistic basis, with the best solution being the most probable. A Bayesian network is used in one configuration of the invention, which allows the system to be trained from the data entered into the system. To understand the semantic analyzer, it may be important to understand how an interpretive Bayesian network contributes to semantic analysis.

FIG. 5 is a diagram illustrating an example of a Bayesian network. Leaf-level nodes (indicated by reference numbers 501 through 507) correspond to word-level concepts; higher-level nodes (indicated at 508 through 510) correspond to higher level interpretive concepts integrating the lower concepts. The highest level node (or root node), indicated at 511, contains the broadest conceptual statement of the sentence or phrase: in the case of admit information, the condition of the patient.

Semantically significant words seen in actual reports are stored (through network training cases) as possible states of word-level nodes, and have a meaning defined by those nodes. For instance, words, such as "angina" or "lupus" will usually carry the central or "topic" meaning of phrases describing those conditions, while words such as "right" and "lower" usually play the role of modifiers to anatomic locations. Semantic analysis consists of finding the optimal (i.e., most probable) matching of words and phrases to word-level network states. This generates a set of hypotheses about the meanings of those words in the context of whole report. For instance, given the input text "unstable angina", the network would come up with the list of most-probable node/state pairs in Table 1.

TABLE 1

| NODE | STATE |
| --- | --- |
| *condition: | *intermediate coronary syndrome (unstable angina) <411.1> (0.995597)* |
| *state unit: | *present (0.999887) |
| presence marker: | null (0.982195) |
| *topic unit: | *unstable angina (0.99999) |
| topic: | angina.about.n (1.0) |
| topic mod: | unstable.about.adj (1.0) |
| *anatomic unit: | *null (0.996375) |
| anat loc: | null (0.992519) |
| anat loc mod: | null (0.999435) |
| anat mod1: | null (0.992106) |
| anat mod2: | null (0.998556) |

This says, in essence, that "angina" (here restricted to be an noun) is the "topic" or "essence" of the test; "unstable" is a term that modifies that topic. All other word-level nodes are slotted as "null" (meaning that the text contains no information about them). The higher-level concept "*state unit" has inferred that the condition is "resent" (as opposed to "absent", "status post" or "attempting to rule out"). The highest-probability state for the "condition" node represents the admission diagnosis. A correct diagnosis is sometimes a function not just of the literal meaning of the text, but of other factors as well, such as patient billing type and doctor type. As was noted previously, patient information regarding patient type and doctor type is collected and available with the initial admit record. For instance, given the test "failed hip replacement", patient type may determine whether the correct code should correspond to "complications of mechanical failure" or to "convalescence following surgery". There are also cases where several sentences might be entered but only the first is relevant to the diagnosis, or where the diagnosis might be a function of the separate meanings of several sentences.

The admission diagnosis (condition) can be represented as a standard ICD9 code. The ICD9 code is written to database on data storage device 103 and ultimately transferred to computer system 100. In the above example, given the input text "unstable angina", the highest probability state of the "condition" node would be the state "*intermediate coronary syndrome (unstable angina) <411.1>". The ICD9 code for this condition is 411.1, and is embedded in the state name. This value is stored in the Oracle table.

Belief networks which might be most apt at interpreting the text (there might be several, e.g., networks for recognizing diseases, finding, or apparatus descriptions) are first identified. Then, a syntactic parsetree and appropriate linguistic transformations may be produced. Although in the example shown here a single parse tree is used, in some cases the best results may be obtained by combining several parse trees, and this capability is included in one configuration of the software.

The semantic analyzer "walks" the syntactic parsetree from the bottom up, finding optimal network assignments for words as it proceeds. It considers first the phrasal heads, given that heads of phrases are most likely to have a meaning central to the meaning of the overall phrase, and in terms of which the other phrase components can be best understood. (For instance, in the phrase "behind the left upper lobe", processing "left" in the context of "lobe" is more likely to lead to correct understanding of anatomic location than processing "left" with "behind".) The semantic analyzer identifies possible sets of word-level network assignments for the lowest-level phrases in the parse tree. It then recursively combines lower-level sets of assignments to generate assignments for higher level phrases, until the entire phrase or sentence has been covered. The assignments for higher level phrases, which include two or more lower-level phrases, are selected on the basis of the combined lower-level phrases, which are most probable to occur in combination. As it proceeds, the semantic analyzer also posits hypotheses about things the text does not say, by binding null states to nodes representing concepts which apparently have not been expressed. This process is guided by rules used to identify which possible node/state pairings are legal, which are consistent, which are semantically coherent and which are optimally semantically coherent. Finally, the highest probability state for each node is selected, to give the best interpretation of the text. The end result is a set of pairings of words or phrases to text-level nodes, consistent with the parse tree and with hypotheses about what has and has not been said, and yielding the most unambiguous probabilities for the network as a whole. The highest-probability state in the "condition" node represents the best interpretation of the text.

IV. Training of the Bayesian Network

Figure 6:
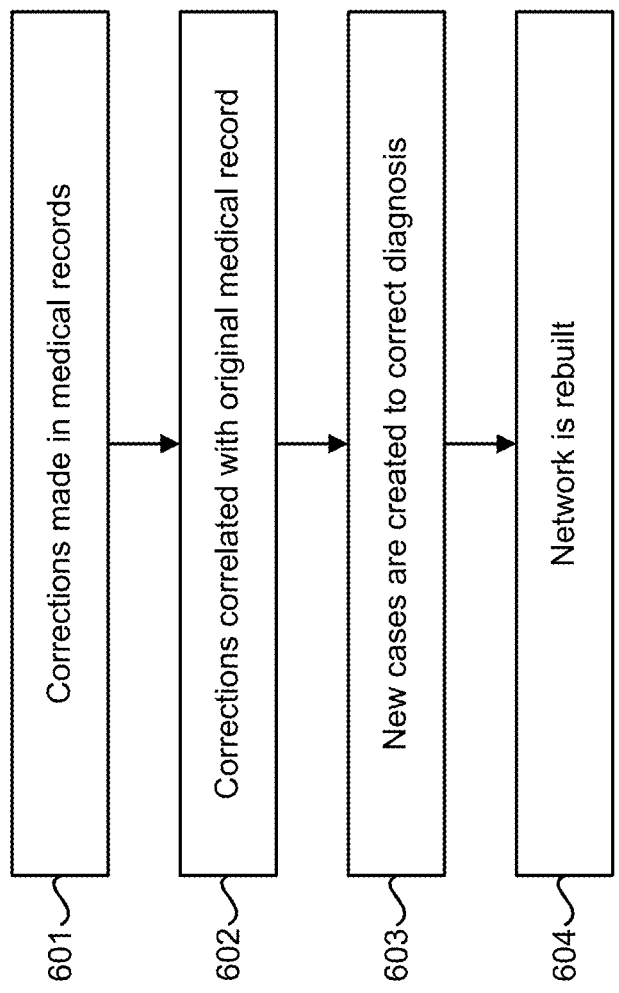
FIG. 6 is a flow diagram illustrating a method for training the Bayesian network.

FIG. 6 is a flow diagram illustrating a method for training the Bayesian network. As noted previously, the "condition" results (in the form of ICD9 codes) generated by the inventive system are assessed each day by Medical Records personnel, and correct codes are entered manually for any cases in which the system was unable to generate a code, or generated an incorrect code (step 601 in FIG. 6). As they are entered, a routine on the hospital information system running on computer system 100 recognizes corrections to the codes and stores them to a table on the Oracle database on data storage device 103. The corrected codes are then correlated with the originally generated codes (step 602). At periodic intervals, the correction records are used to create new inputs to and corrections for the interpretive belief (Bayesian) network (step 603). These records are reviewed via a tool which creates new training cases incorporated into the network probabilities when the network is rebuilt. Another tool can be used to view all the cases that have gone into training the network so far, and thus reflect all the experience and biases of the network, and to make corrections to those cases. Ultimately, the network is rebuilt using the revised training set (step 604). The steps of new case creation and network rebuilding are performed manually, by trained personnel making use of the tools described above. New inputs are created and the network trained at intervals dependent on the number of new errors produced by the system and at the convenience of the personnel. Typically, new input creation and network training are performed at roughly weekly intervals.

V. Commercially Available Code Used in Conjunction with the Main Source Code Contained in the Netica Product One configuration of the invention uses a Bayesian network Netica API from Norsys Software Corporation. An interface routine takes a set of proposed node/state assignments and passes them to the Netica API, through a call to a routine in a shared library. This shared library is written in C, and is compiled with the libraries contained in the Netica API. (after performing this instantiation, a complete snapshot of the resulting network state is written to a file, which is read in by the interface routine and interpreted by the semantic analyzer.

Figure 7:
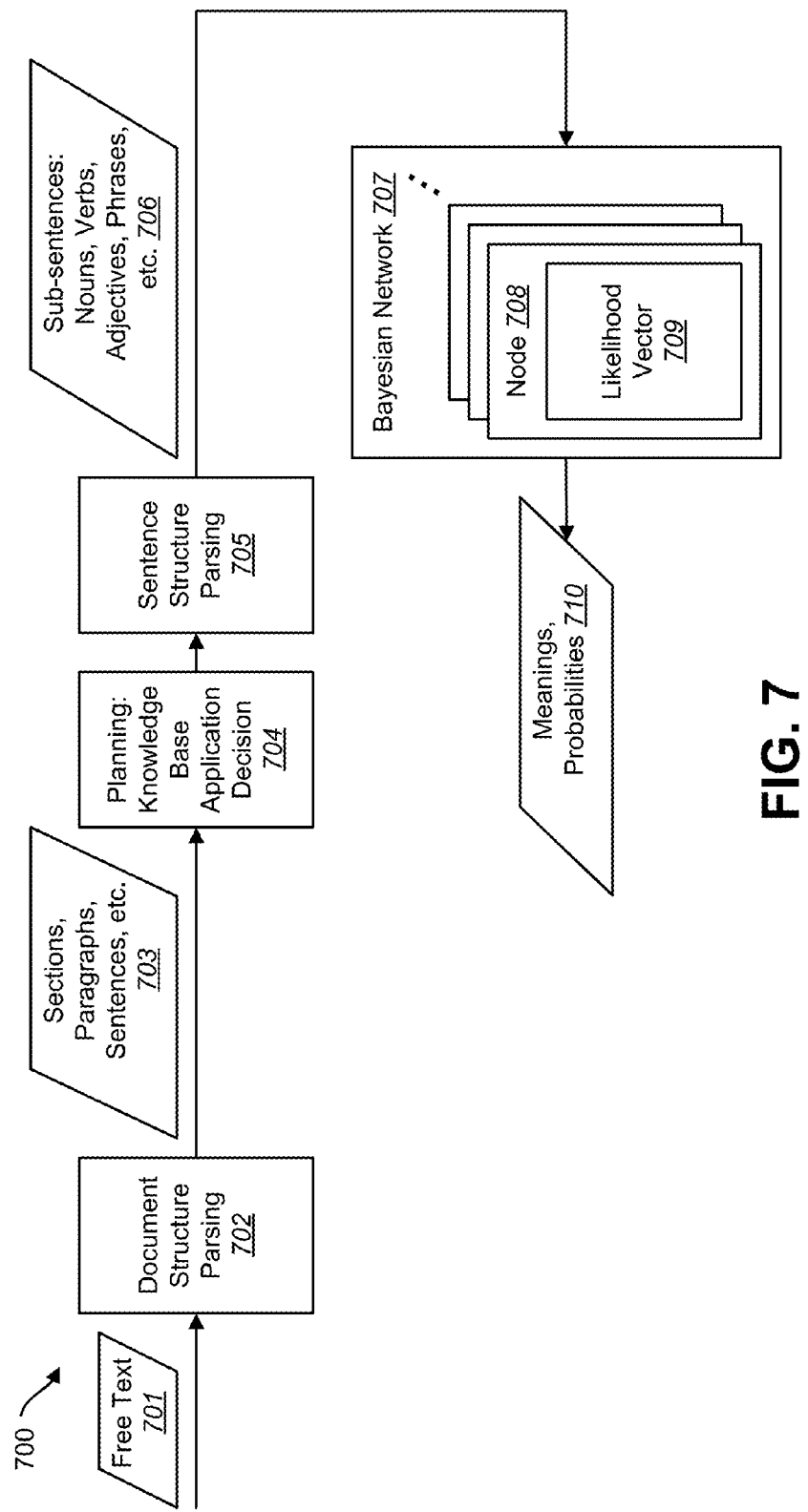
FIG. 7 is a block diagram illustrating natural language processing of a free text document.

FIG. 7 is a block diagram illustrating natural language processing 700 of a free text document 701. The free text document 701 may be a medical report, for example. Free text documents 701 could include titles, sections, paragraphs, sentences, tables, and other structures used to convey information. The free text document 701 may be processed by a document structure parsing module 702. The document structure parsing module 702 attempts to identify different structures in the free text document 701. For instance, the document structure parsing module 702 parses the free text document 701 for gross structure by identifying sections, paragraphs, and sentences. The document structure parsing module 702 may output sections, paragraphs, and sentences, etc. 703. In particular, the sections, paragraphs, and sentences 703 may be formatted into an Extensible Markup Language (XML) file, where the sections, paragraphs, and sentences 703 are labeled accordingly. This data 703 may be passed to a planning module 704. The planning module 704 may determine which knowledge bases should be applied to the data 703. The section, paragraph, and sentence data 703 may then be passed to a sentence structure parsing module 705. The sentence structure parsing module 705 parses the data 703 for fine structure by identifying certain "sub-sentence components" 706. Examples of sub-sentence components 706 include nouns, verbs, adjectives, noun phrases, prepositional phrases, verb phrases, relative clauses and other phrases. These sub-sentence components 706 may then be passed to a Bayesian network 707. The Bayesian network 707 may work against any sub-sentence component for which it is trained. The Bayesian network 707 may include nodes 708. The nodes 708 may represent random variables and may be associated with probability functions. Generally, the Bayesian network 707 may be used to determine the most likely semantic meaning of relevant parts of the free text in the document 701. That is, the Bayesian network 707 may intelligently associate components from sentences (i.e. sub-sentences) that contribute to extracting one or more specific concepts. These concepts may be generally reflected in more than one phrasal component.

The Bayesian network 707 may take an interaction between semantic and syntactic parts of a parser to extract these concepts. For example, the Bayesian network 707 may take various sub-sentences 706 into the nodes 708, where it may probabilistically determine meanings and probabilities 710 (i.e. that the free text document 701 has a particular semantic meaning). Specifically, the Bayesian network 707 may determine the most likely medical condition discussed in a medical report. These meanings and probabilities 710 may be outputted (e.g. stored in a searchable database or used for some application). For example, the meanings and probabilities 710 might be used to code medical data or might be structured such that research may be performed on the structured data.

Within an individual Bayesian network 707, the key parameters for computing probability may be contained in conditional probability tables. In order to bring information into a Bayesian network from some outside source, individual nodes (i.e. variables) may often be instantiated with distinct values. However, an alternative may be to pass into the nodes 708 likelihood vectors 709 that are generated outside of the Bayesian network 707 (i.e. either through a computerized algorithm or possibly by inspecting a different Bayesian network with similar nodes for changes to the nodes 708). In other words, the nodes 708 may be associated with likelihood vectors 709. The likelihood vectors 709 may provide a measure of how much the probabilities of one or more meanings associated with the sub-sentences change depending on "additional" information (i.e. that is external to the Bayesian network 707). For example, one node 708 may represent a first sub-sentence that could have several different meanings, each with a probability of correctness. In this example, a likelihood vector 709 may use a second sub-sentence from a different part of the free text document 701 to determine a measure of how much the probability of the correctness of meanings of the first sub-sentence change when taking the second sub-sentence into account. These measures contained in the likelihood vector 709 may be used to weight a corresponding node 708, such that the probabilities of the meanings 710 may change accordingly. The key concept here is that the values in a node in the Bayesian network 707 may be instantiated with an individual value or with a likelihood vector 709 that provides a weighted list of values. The likelihood vector 709 may effectively have the same number of values as there are states in the node 708. A node 708, for example, could have thousands of states. A simple Bayesian function updates the probabilities of the node 708 in the context of the likelihood vector 709. It thus follows that the determination of the most likely concept returned by the Bayesian network 707 may be affected or changed depending on the operation of the likelihood vectors 709. In other words, likelihood vectors 709 may be used as a way of introducing words and short or long phrases (e.g. tokens) into a Bayesian network 707 as input. The output of the Bayesian network 710 may be the concepts (represented in other nodes 708 in the Bayesian network 707) whose probabilities would be updated. In one configuration, the Bayesian network 707 may have single values plugged into variables that accepted tokens from a sentence or sub-sentence.

Using likelihood vectors 709 as disclosed herein may provide several advantages or benefits. One advantage to using likelihood vectors 709 in the context of this disclosure is that they may allow simplification of the Bayesian network 707 (i.e. it is not needed to have a group of specific nodes 708 designated to accept only a small class of tokens). For example, in earlier systems, multiple nodes with subsets of possible tokens that could be used were needed. Using the approach disclosed herein allows single nodes to replace multiple nodes and allows whole phrases to be slotted into one node that otherwise would have been spread across multiple specialized nodes. The use of likelihood vectors 709 may also ease the burden of creating training sets (i.e. a certain amount of token slotting may be automated during training in many circumstances). More specifically, token slotting is the introduction of data into a node. A single value or a group of (possibly weighted) values may be introduced. Once the node values are set, the Bayesian network 707 may be triggered to estimate probabilities for values of the other nodes. Another advantage of using likelihood vectors 709 may be when there is ambiguity in which node 708 should receive a specific word. More specifically, an earlier model assumed that a token belonged in one node, but allowed the domain of several nodes to contain the same token. The ambiguity was the need to make a choice of which node to use. In the approach disclosed herein, a single node may replace multiple nodes, and the token (i.e. along with a group of other tokens) may be slotted without concern for the multiple choices.

FIG. 8 is a flow diagram illustrating the operation 800 of a semantic analyzer. Generally, the semantic analyzer may inspect the structural components (i.e. words or phrases) identified in the sub-sentence by the syntactic processor, identify words or sub-phrases that match possible states in the nodes in the Bayesian network (i.e. "tokens"). The semantic analyzer may use the value of the tokens to set the values of the nodes. The semantic analyzer may then trigger calculation of the concepts represented by the words or phrases and harvest the results as the output of the procedure. If the semantic analyzer determines that the results are sufficiently ambiguous (e.g. have multiple potential assignments), it may attempt to use different words or phrases from the parser to find a less ambiguous result. Alternatively, the semantic analyzer can accommodate the assignment of a token word or phrase to multiple different nodes. Under some circumstances, the semantic analyzer can predict which sub-sentence should be input to get the best result. The procedure used in the semantic analyzer may be similar to the operation discussed above; it may utilize likelihood vectors to improve performance. For example, likelihood vectors may be used to allow simplification of the Bayesian network 707 and/or to simplify the creation of training material. The semantic analyzer may operate via a Bayesian network 707. The semantic analyzer "walks" the syntactic parse tree from the bottom up, finding optimal network assignments for words as it proceeds. Some of the nodes may represent individual words or short phrases, others may represent intermediate concepts (e.g. anatomical location) and yet others may represent final or summary concepts that can be used in further applications (e.g. clinical reasoning). In one configuration, the semantic analyzer inspects all of the nodes that are designated as taking word or phrase tokens as input. Each of the words or phrases found in the sub-sentence is added to a likelihood vector to be input into one or more nodes. The semantic analyzer may identify 801 possible sets of word-level network assignment for the lowest-level phrases in the parsetree. For example, the semantic analyzer may first consider phrasal heads, given that heads of phrases are most likely to have a meaning central to the meaning of the overall phrase, and in terms of which the other phrase components can be best understood. For example, in the phrase "behind the left upper lobe", processing "left" in the context of "lobe" is more likely to lead to correct understanding of anatomic location than processing "left" with "behind". In this particular example, each of the terms (e.g. "left," "lobe," "behind") may be added into a likelihood vector for each node that contained them. The semantic analyzer may identify 802 assignments that have multiple different potential or "ambiguous" assignments. The assignments may be "ambiguous" to the extent that a given token might be a value for several different nodes. The semantic analyzer may create 803 likelihood vectors for all nodes that will cover all potential assignments. The semantic analyzer may then instantiate 804 the likelihood vectors by placing all of the words in whatever vectors they fit in and then using these to set the values of the variables for each node. The assignments for higher level phrases, which may include two or more lower-level phrases, are selected on the basis of the combined lower-level phrases, which are most probable to occur in combination.

As it proceeds, the semantic analyzer may also posit hypotheses about things the text does not say, by identifying 805 optimal null assignments for unassigned word-level nodes. This process is guided by rules used to identify which possible node/state pairings are legal, which are consistent, which are semantically coherent and which are optimally semantically coherent. Finally, the highest probability state for each node is selected 806 that give the best interpretation of the text. The end result is a set of pairings of words or phrases to text-level nodes, consistent with the parse tree and with hypotheses about what has and has not been said, and yielding the most unambiguous probabilities for the network as a whole. The highest-probability state in the "condition" node represents the best interpretation of the text. In this way, the parsed document (e.g. sub-sentences 706) and likelihood vectors may be applied to the Bayesian network 707.

Figure 9A:
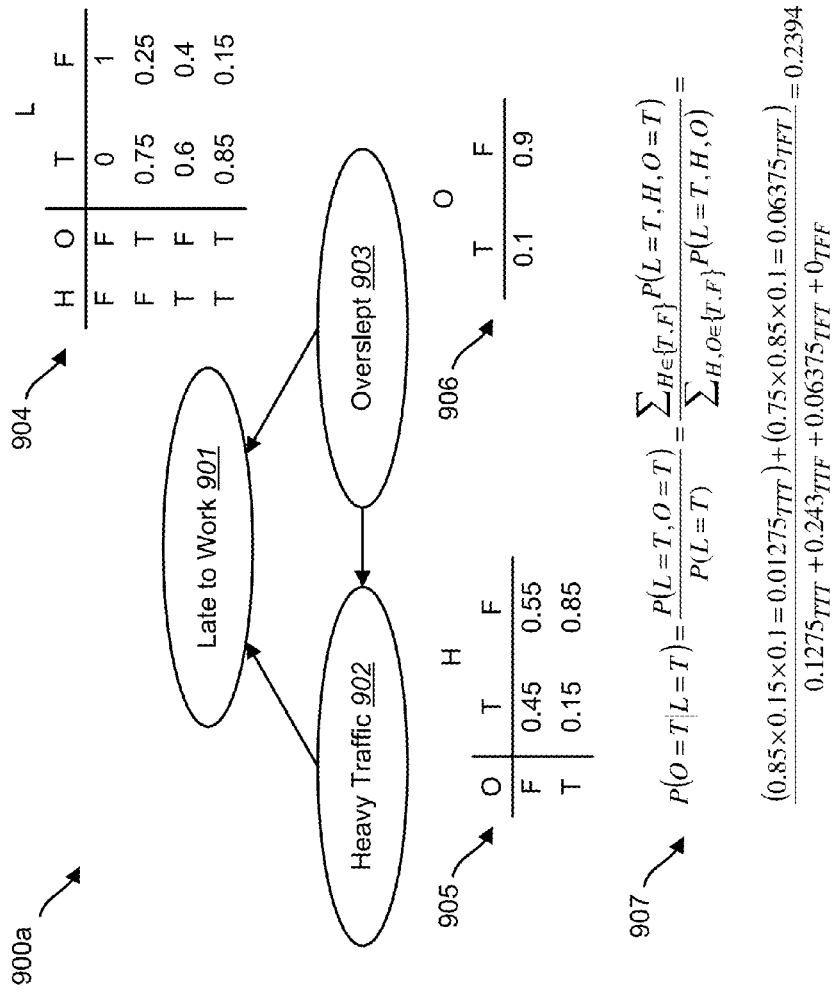
FIG. 9A is a diagram illustrating a simple example of a Bayesian network.

FIG. 9A is a diagram illustrating a simple example of a Bayesian network 900a. In this example, the Bayesian network 900a includes three nodes. The three nodes represent random variables which represent the probability of three events occurring. The three events are, respectively, whether an employee is late to work 901 (random variable "L"), whether the employee encountered heavy traffic 902 on the way to work (random variable "H"), and whether the employee overslept 903 (random variable "O"). The arrows between the nodes 901, 902, 903 represent the interrelation between the three nodes. Three tables 904, 905, 906 indicate the probability of the three events occurring. In the tables, T represents the probability that the (corresponding) event occurred ("True"), while F represents the probability that the (corresponding) event did not occur ("False"). Table O 906 indicates that, without considering other factors, the employee has a 0.1 (i.e. 10%) probability of oversleeping, and a 0.9 (i.e. 90%) probability of not oversleeping. Table H 905 indicates that when the employee does not oversleep, he has a 0.45 (i.e. 45%) probability of encountering heavy traffic, and a 0.55 (i.e. 55%) probability of avoiding heavy traffic. Table H 905 also indicates that when the employee oversleeps, he has a 0.15 (i.e. 15%) probability encountering heavy traffic, and a 0.85 (i.e. 85%) probability of not hitting heavy traffic. One can consider that he is less likely to encounter heavy traffic when oversleeping, since he might miss rush hour as a result of the delay in oversleeping. Table L 904 indicates that when the employee does not encounter heavy traffic and does not oversleep, he is never late to work (i.e. he has 0 probability of being late to work). However, when the employee oversleeps but avoids heavy traffic, he has a 0.75 (i.e. 75%) probability of being late to work (and 0.25 probability of being on time). Further, when the employee encounters heavy traffic but does not oversleep, he has a 0.6 (i.e. 60%) probability of being late to work (and a 0.4 or 40% probability of arriving on time). When the employee both oversleeps and encounters heavy traffic, he has a 0.85 (i.e. 85%) probability of being late to work, and thus has a 0.15 probability of being on time.

The Bayesian network 900a may be used to calculate different probabilities. In this example, the equation 907 (i.e. represented by the Bayesian network 900a) may be used to calculate the probability that the employee overslept (O=T), given that the employee was late to work (L=T). In other words, an employer could use this equation 907 to calculate the probability that his employee overslept if the employee showed up late to work. Given this information in this example, the employer would be able to calculate that if the employee was late, the probability that he overslept is 0.2394, or about 24%. The equation in FIG. 9A is also shown here (in part) as equation (1) below:

$$P(O = T \mid L = T) = \frac{P(L = T, O = T)}{P(L = T)} \quad (1)$$

$$= \frac{\sum_{H \in \{T,F\}} P(L = T, H, O = T)}{\sum_{H,O \in \{T,F\}} P(L = T, H, O)}$$

$$= 0.2394$$

This equation is given as an example to aid in understanding how results would be calculated for a closed form in the demonstrated model. However, the calculations involved in the systems and methods disclosed herein may involve calculating marginals and multilevel networks where nodes have multiple parents and multiple children. Algorithms designed to accomplish these calculations function by compiling the Bayesian network 900a into a collection of structures in tables specific to the computation model (a number of exact and inexact computational approaches exist) and calculating using recursive algorithms up and down through the various levels of the Bayesian network 900a. Thus, the calculation is Bayesian in nature, similar to the calculation shown in equation (1).

Figure 9B:
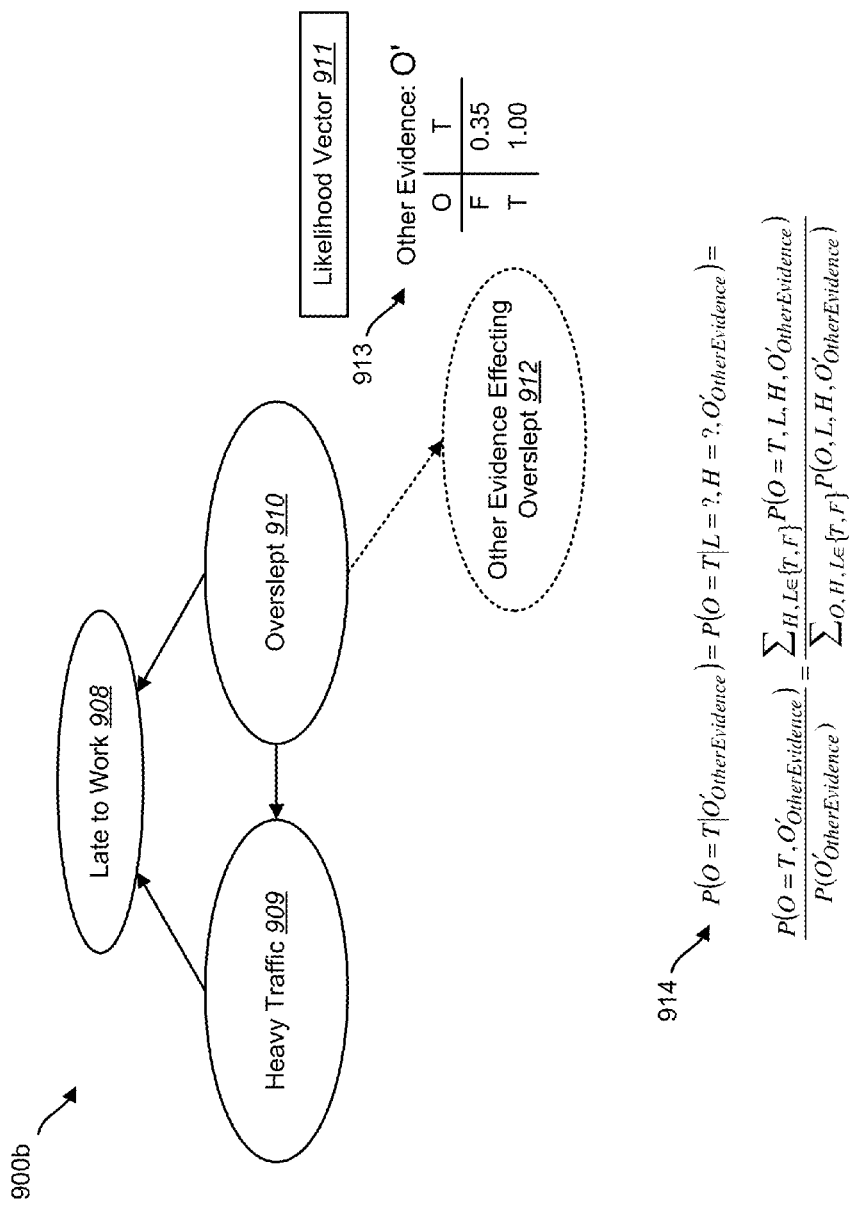
FIG. 9B is a diagram illustrating an example of a Bayesian network operating in conjunction with a likelihood vector.

FIG. 9B is a diagram illustrating an example of a Bayesian network 900b operating in conjunction with a likelihood vector 911. In this example, the three nodes shown similarly represent random variables that represent the likelihood that an employee is late to work 908, that the employee encountered heavy traffic 909, and that the employee overslept 910. In this example, the "overslept" node 910 also incorporates a likelihood vector 911. In this example, an additional piece of information is known: O'$_{OtherEvidence}$. That additional piece of information may be taken into account. For purposes of example, the additional information could be whether the employee's alarm did not work. This additional piece of information may be used to generate the likelihood vector 911. In effect, the likelihood vector 911 is a measure of the amount of information presented by the additional information. The likelihood vector 911 may also be considered to be a measure on how much of a change is induced in the probability of an event occurring when the additional piece of information is known, as illustrated in the table 913. In this example, the likelihood vector 911 induces a calculation of the probability that an employee overslept (O=T) independent of the other information in the Bayesian network 900b. Addition of values for the other nodes in the network (i.e. "Late to Work" and "Heavy Traffic") may further increase or decrease the probability that the employee overslept. In this example, the knowledge that the employee's alarm did not work increases the probability that the employee overslept. This, for example, will affect the probability that the employee overslept, and thus may effect the determination by the Bayesian network 900b. In this example, the likelihood vector 911 behaves as if another (invisible) node 912 were attached to the targeted "overslept" node 910 and a set of values from the invisible node's 912 conditional probability table 913 were being used in the calculation. In this example, the calculation that incorporates the other evidence likelihood vector 911 is similar to example given in 9A. An equation 914 representing the calculation is illustrated in FIG. 9B and is also shown in equation (2) below.

$$P(O = T \mid O'_{OtherEvidence}) = P(O = T \mid L = ?, H = ?, O'_{OtherEvidence}) \quad (2)$$

$$= \frac{P(O = T, O'_{OtherEvidence})}{P(O'_{OtherEvidence})}$$

$$= \frac{\sum_{H,L \in \{T,F\}} P(O = T, L, H, O'_{OtherEvidence})}{\sum_{O,H,L \in \{T,F\}} P(O, L, H, O'_{OtherEvidence})}$$

In one sense, using the likelihood vector 911 is like adding another node (i.e. variable) 912, but with preselecting the node's 912 value (i.e. and therefore the input probabilities for the Bayesian calculation). This may similarly be expressed as shown in equation (3) below.

$$P(O = T \mid O' = OtherEvidence) = P(O = T \mid L = ?, H = ?, O' = OtherEvidence) \quad (3)$$

$$= \frac{P(O = T, O' = OtherEvidence)}{P(O' = OtherEvidence)}$$

$$= \frac{\sum_{H,L \in \{T,F\}} P(O = T, L, H, O' = OtherEvidence)}{\sum_{O,H,L \in \{T,F\}} P(O, L, H, O' = OtherEvidence)}$$

Although only one simple example is given for the likelihood vector 911, the likelihood vector 911 may comprise multiple probabilities (i.e. up to the number of values that can be taken by the node). Furthermore, likelihood vectors 911 may be input into any node in the Bayesian network.

Pseudo code for a general purpose phrase parsing algorithm is listed below in Listing 1.

LISTING 1.

```
Start Algorithm
    Inspect the Bayesian Network and fill Likelihood Vector Table;
    Assign Minimum Acceptable Probability;
    Input Phrase to system
    Read Phrase from Left to Right processing each word
        While there are unprocessed words in the phrase Do;
            Examine current word;
```

-continued

LISTING 1.

```
If this word is not in the Ignore List Then
    WordUsed = 0;
    For each "Token" type node
        For each state in the likelihood vector
            If the state = the word,
                Set the associated likelihood vector value to 1;
                WordUsed = WordUsed + 1;
            End For each state loop;
        End For each "Token" type node Loop;
        If WordUse = 0 Then add word to ReviewList;
    EndIf;
When no more words,
    End While Loop;
    For each "Token" type node;
        If all of the values in the likelihood vector = 0 and a "null" state
        exists within the node,
            Find the "null" state within the node;
            Set the likelihood vector value for the "null" state to 1;
        If all of the values in the likelihood vector = 0 and no "null" state
        exists,
            Set all values of the likelihood vector for the node to 1;
    When no more "Token" type nodes,
        End For Loop;
Process the Bayesian network by applying the likelihood vectors to each
of the "Token" type nodes;
    If maximum probability of a value in Key Concept >= Minimum
    Acceptable Probability,
        Assign this value as the Key Concept for the Title/Section Header;
        End Algorithm;
    Else,
        Store phrase in Unrecognized Word/Phrase Table;
        End Algorithm;
Return value and probability of Key Concept if it exists or a failure mode
if not (ambiguous phrase);
```

The algorithm illustrated above is for parsing a collection of terms or words that represent a conceptual object. This object can be represented as a Bayesian Network with all or part of its nodes instantiated or as a data object representing the Bayesian Network structure, but containing a coded phrase. The algorithm assumes that an appropriate Bayesian Network is available to process the phrase represented according to the concepts that are to be recognized. A "phrase" in this case includes anything from a single word to a simple sentence. In this example, tokens may be words or phrases that are represented within the input nodes as possible states.

The algorithm illustrated above does not require the Bayesian Network to be run. It requires that each terminal node be inspected, and a likelihood vector representing its potential states be created. This is a vector of numbers between 0 and 1. Each value of the vector is linked to the associated state from the node. This vector represents a likelihood vector for input into the particular node. This vector is initially a vector of zeros. The goal of the algorithm is to set at least one value in each likelihood vector to 1.

In its simple form, this algorithm treats the phrase being parsed as a bag of words whose meaning is largely (but not completely) independent of the word order. In addition, there is a list of words in the Ignore List (mostly articles like "the", "a", "an", etc.) which are ignored during the parse. The phrase is read from left to right, with each word of the phrase being processed. Each word may be found in more than one "Token" type node. The appropriate value in the likelihood vector should converted to 1 for all instances when "the state=the word" in all nodes where the word is found.

After all the words of the phrase have been read, the likelihood vectors for some of the "Token" nodes will still be all zeros. In order for it to work, the Bayesian Network requires at least one nonzero value in each node. The algorithm inspects each "Token" type node to make sure at least one value in the state vector is set to 1. These procedures are only used for "Token" type nodes. The concept nodes will get their values when the Bayesian Network is calculated.

Figure 10:
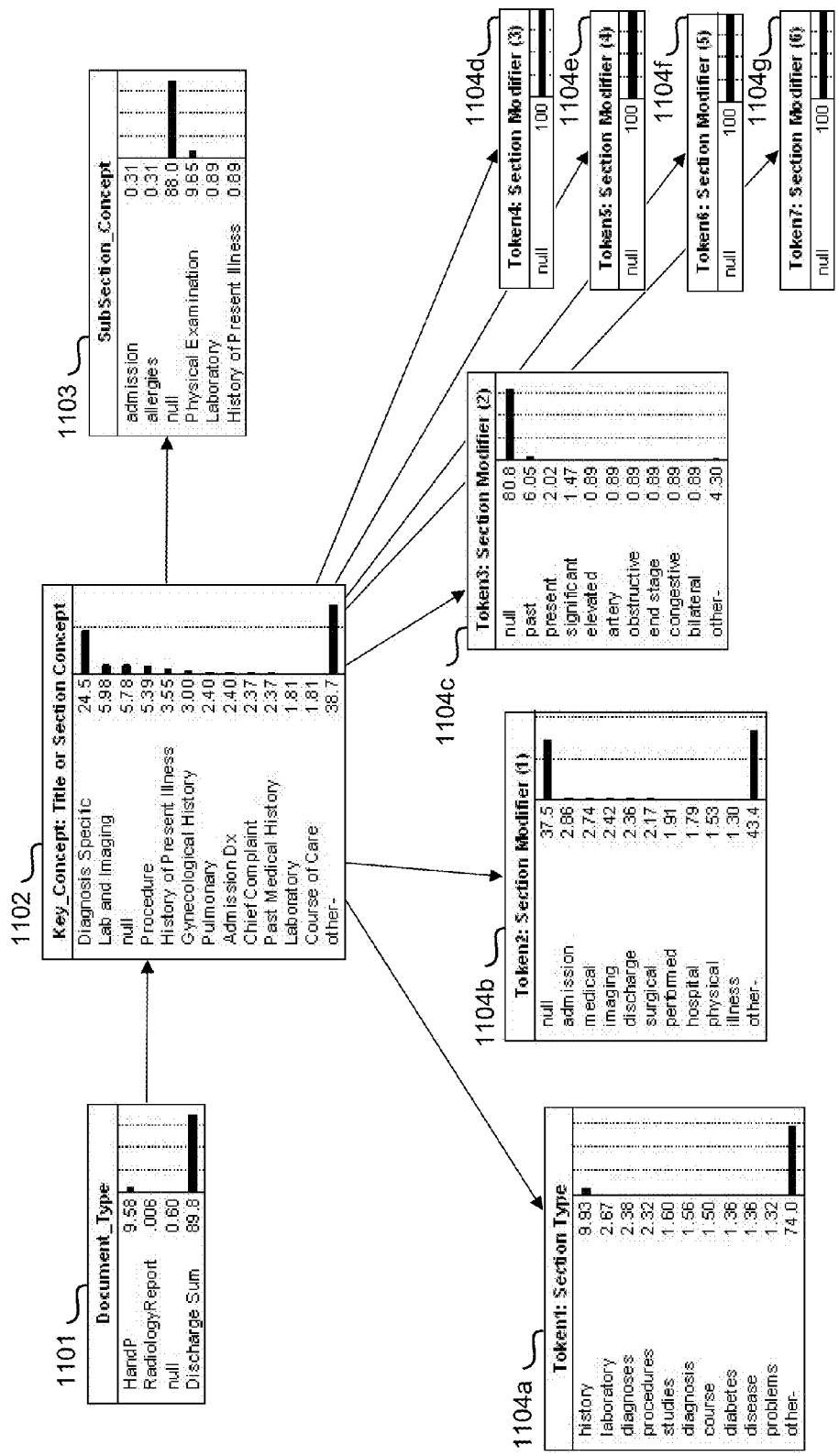
FIG. 10 is a block diagram illustrating an example of a Bayesian network used for section header identification.

FIG. 10 is a block diagram illustrating an example of a Bayesian network used for section header identification (e.g. in a structure parser 702). Shown are the document type 1101, the key concept 1102, the subsection concept 1103, and a number of different "Tokens" 1104a-g used. The blocks 1101, 1102, 1103, 1104a-g represent nodes in a Bayesian network. The arrows represent Bayesian network edges. The probabilities included in the blocks 1101, 1102, 1103, 1104a-g represent initial node likelihoods Likelihood vectors may also be similarly applied to a Bayesian network in a structure parser 702 to improve Bayesian network performance.

Figure 11:
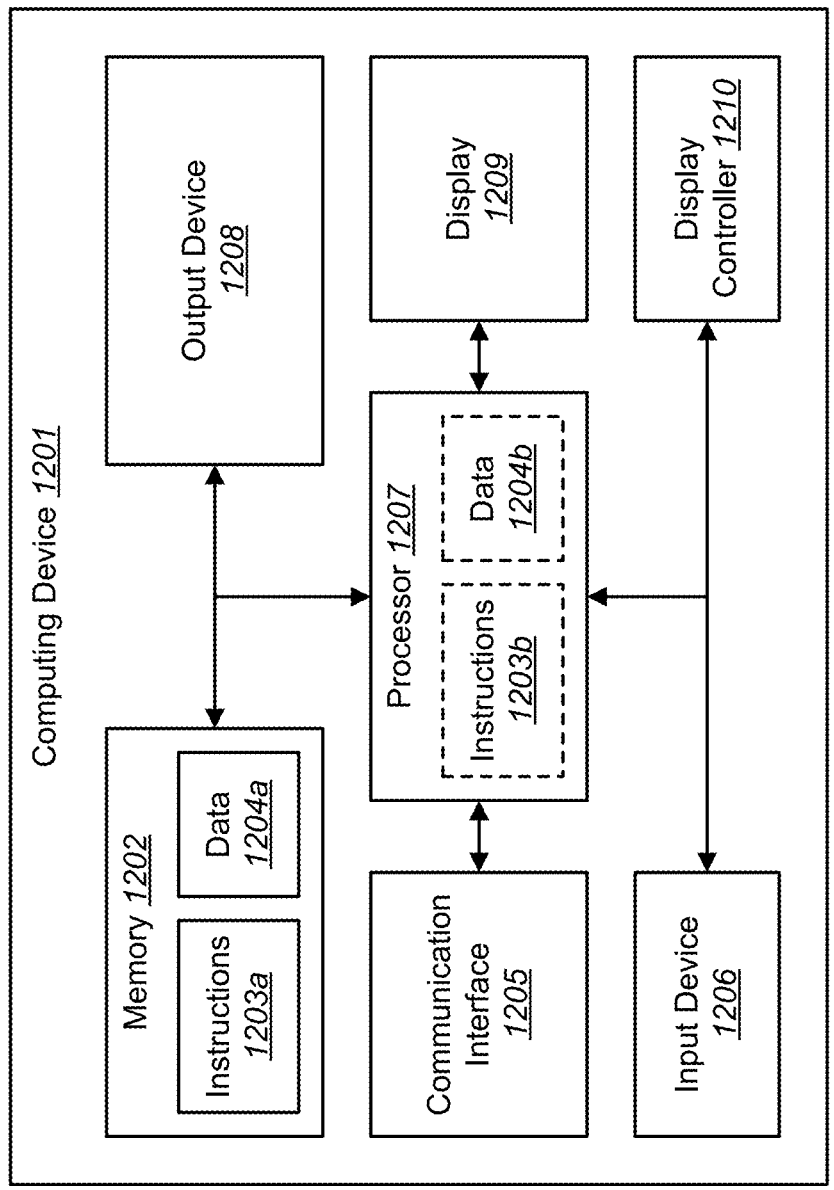
FIG. 11 illustrates various components that may be utilized in a computing device.

FIG. 11 illustrates various components that may be utilized in a computing device 1201. The illustrated components may be located within the same physical structure or in separate housings or structures.

The computing device 1201 may include a processor 1207 and memory 1202. The processor 1207 controls the operation of the computing device 1201 and may be, for example, a microprocessor, a microcontroller, a digital signal processor (DSP) or other device known in the art. The processor 1207 typically performs logical and arithmetic operations based on program instructions 1203a and data 1204a stored within the memory 1202. Instructions 1203b and data 1204b may also be loaded onto the processor 1207.

The computing device 1201 typically may include one or more communication interfaces 1205 for communicating with other electronic devices. The communication interfaces 1205 may be based on wired communication technology, wireless communication technology, or both. Examples of different types of communication interfaces 1205 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1201 typically may include one or more input devices 1206 and one or more output devices 1208. Examples of different kinds of input devices 1206 include a keyboard, mouse, microphone, remote control device, button, joystick, trackball, touchpad, lightpen, etc. Examples of different kinds of output devices 1208 include a speaker, printer, etc. One specific type of output device which may be typically included in a computer system is a display device 1209. Display devices 1209 used with configurations disclosed herein may utilize any suitable image projection technology, such as a cathode ray tube (CRT), liquid crystal display (LCD), light-emitting diode (LED), gas plasma, electroluminescence, or the like. A display controller 1210 may also be provided, for converting data stored in the memory 1202 into text, graphics, and/or moving images (as appropriate) shown on the display device 1209.

Of course, FIG. 11 illustrates only one possible configuration of a computing device 1201. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for natural language processing on a computing device, comprising:
   receiving a free text document;
   parsing, on a computing device, the free text document for gross structure, wherein the gross structure comprises sections, paragraphs and sentences;
   determining, on the computing device, an application of at least one knowledge base;
   parsing the free text document for fine structure on the computing device, wherein the fine structure comprises sub-sentences;
   applying, on the computing device, the parsed document and at least one likelihood vector to a Bayesian network, wherein applying the parsed document and the at least one likelihood vector to the Bayesian network comprises:
      identifying, on the computing device, possible sets of word-level network assignments for lowest-level phrases in a parse tree;
      identifying, on the computing device, assignments that have multiple different potential assignments;
      creating, on the computing device, likelihood vectors for all nodes of the Bayesian network, wherein the likelihood vectors cover all potential assignments;
      instantiating the likelihood vectors on the computing device;
      identifying, on the computing device, optimal null assignments for unassigned word-level nodes; and
      selecting, on the computing device, the highest probability state for each node to obtain an interpretation of the free text document; and
   outputting meanings and probabilities from the computing device.

2. The method of claim 1, wherein the likelihood vectors are calculated based on a first probability that a statement in the free text document has a particular meaning and a second probability that the statement has the particular meaning given additional information from outside the Bayesian network.

3. The method of claim 1, wherein outputting meanings and probabilities comprises storing the meanings and probabilities in a database.

4. The method of claim 1, further comprising encoding, on the computing device, at least one portion of the free text based on the meanings and probabilities.

5. The method of claim 1, wherein applying the at least one likelihood vector to the Bayesian network simplifies the Bayesian network.

6. The method of claim 5, wherein the Bayesian network is simplified such that a single node replaces multiple nodes.

7. The method of claim 1, wherein applying the at least one likelihood vector to the Bayesian network introduces at least one value into a node.

8. The method of claim 7, wherein applying the at least one likelihood vector allows an amount of token slotting during training to be automated.

9. The method of claim 1, wherein applying the at least one likelihood vector allows multiple nodes to be replaced with a signal node, wherein at least one token may be slotted without concern for multiple choices.

10. A computing device that is configured for natural language processing on a computing device, comprising:
 a processor;
 memory in electronic communication with the processor;
 instructions stored in the memory, the instructions being executable to:
  receive a free text document;
  parse the free text document for gross structure, wherein the gross structure comprises sections, paragraphs and sentences;
  determine an application of at least one knowledge base;
  parse the free text document for fine structure, wherein the fine structure comprises sub-sentences;
  apply the parsed document and at least one likelihood vector to a Bayesian network, wherein the instructions to apply the parsed document and the at least one likelihood vector to the Bayesian network comprises instructions executable to:
   identify possible sets of word-level network assignments for lowest-level phrases in a parse tree;
   identify assignments that have multiple different potential assignments;
   create likelihood vectors for all nodes of the Bayesian network, wherein the likelihood vectors cover all potential assignments;
   instantiate the likelihood vectors;
   identify optimal null assignments for unassigned word-level nodes; and
   select the highest probability state for each node to obtain an interpretation of the free text document; and
  output meanings and probabilities.

11. The computing device of claim 10, wherein the likelihood vectors are calculated based on a first probability that a statement in the free text document has a particular meaning and a second probability that the statement has the particular meaning given additional information from outside the Bayesian network.

12. The computing device of claim 10, wherein outputting meanings and probabilities comprises storing the meanings and probabilities in a database.

13. The computing device of claim 10, wherein the instructions are further executable to encode at least one portion of the free text based on the meanings and probabilities.

14. The computing device of claim 10, wherein applying the at least one likelihood vector to the Bayesian network simplifies the Bayesian network.

15. The computing device of claim 14, wherein the Bayesian network is simplified such that a single node replaces multiple nodes.

16. The computing device of claim 10, wherein applying the at least one likelihood vector to the Bayesian network introduces at least one value into a node.

17. The computing device of claim 16, wherein applying the at least one likelihood vector allows an amount of token slotting during training to be automated.

18. The computing device of claim 10, wherein applying the at least one likelihood vector allows multiple nodes to be replaced with a signal node, wherein at least one token may be slotted without concern for multiple choices.

* * * * *